(12) United States Patent
Chu et al.

(10) Patent No.: US 10,871,605 B2
(45) Date of Patent: Dec. 22, 2020

(54) LIGHT GUIDE PLATE, MANUFACTURING METHOD THEREOF AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Yang Chu, Beijing (CN); Xian Yang, Beijing (CN); Hongyu Zhao, Beijing (CN); Wenjia Sun, Beijing (CN); Haijun Shi, Beijing (CN); Zhanchang Bu, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 301 days.

(21) Appl. No.: 15/776,521

(22) PCT Filed: Oct. 25, 2017

(86) PCT No.: PCT/CN2017/107572
§ 371 (c)(1),
(2) Date: May 16, 2018

(87) PCT Pub. No.: WO2018/176821
PCT Pub. Date: Oct. 4, 2018

(65) Prior Publication Data
US 2020/0183077 A1    Jun. 11, 2020

(30) Foreign Application Priority Data
Mar. 31, 2017  (CN) .......................... 2017 1 0210152

(51) Int. Cl.
*F21V 8/00*    (2006.01)

(52) U.S. Cl.
CPC ......... *G02B 6/0051* (2013.01); *G02B 6/0055* (2013.01); *G02B 6/0065* (2013.01)

(58) Field of Classification Search
CPC ... G02B 6/0051; G02B 6/0055; G02B 6/0065
See application file for complete search history.

(56) References Cited

U.S. PATENT DOCUMENTS

| | | |
|---|---|---|
| 7,905,651 B2 | 3/2011 | Han et al. |
| 2001/0019479 A1* | 9/2001 | Nakabayashi ....... G02B 6/0028 362/615 |

(Continued)

FOREIGN PATENT DOCUMENTS

| | | |
|---|---|---|
| CN | 1475814 A | 2/2004 |
| CN | 1576991 A | 2/2005 |

(Continued)

OTHER PUBLICATIONS

Second Office Action, including Search Report, for Chinese Patent Application No. 201710210152.8, dated Oct. 19, 2018, 9 pages.

(Continued)

*Primary Examiner* — Donald L Raleigh
(74) *Attorney, Agent, or Firm* — Westman, Champlin & Koehler, P.A.

(57) ABSTRACT

A light guide plate, a manufacturing method thereof, and a display device are provided. The light guide plate includes a glass substrate, an adhesive layer arranged at a surface of the glass substrate, a reflector arranged at a surface of the adhesive layer away from the glass substrate, and a total reflection structure distributed in the adhesive layer.

17 Claims, 4 Drawing Sheets

(56) References Cited

U.S. PATENT DOCUMENTS

| | | | |
|---|---|---|---|
| 2004/0042233 A1* | 3/2004 | Suzuki | G02F 1/133615 |
| | | | 362/561 |
| 2005/0002172 A1 | 1/2005 | Han et al. | |
| 2006/0087865 A1* | 4/2006 | Ha | G02B 5/0278 |
| | | | 362/607 |
| 2006/0103775 A1 | 5/2006 | Chung | |
| 2008/0043492 A1 | 2/2008 | Han et al. | |
| 2010/0208165 A1* | 8/2010 | Kamada | G02B 6/0051 |
| | | | 349/64 |
| 2012/0026431 A1* | 2/2012 | Coggio | G02B 6/0051 |
| | | | 349/65 |
| 2012/0147627 A1* | 6/2012 | Pan | G02B 6/0051 |
| | | | 362/624 |
| 2017/0153385 A1* | 6/2017 | Chang | G02B 6/0088 |
| 2018/0086028 A1* | 3/2018 | Berard | F21S 43/239 |

FOREIGN PATENT DOCUMENTS

| | | |
|---|---|---|
| CN | 1776495 A | 5/2006 |
| CN | 101821649 A | 9/2010 |
| CN | 103797386 A | 5/2014 |
| CN | 105676536 A | 6/2016 |
| CN | 106597600 A | 4/2017 |
| CN | 106842408 A | 6/2017 |

OTHER PUBLICATIONS

International Search Report and Written Opinion, including English translation of Box V of the Written Opinion, for International Application No. PCT/CN2017/107572, dated Jan. 25, 2018, 15 pages.

First Office Action, including Search Report, for Chinese Patent Application No. 201710210152.8, dated Feb. 26, 2018, 14 pages.

\* cited by examiner

LIGHT GUIDE PLATE, MANUFACTURING METHOD THEREOF AND DISPLAY DEVICE

CROSS-REFERENCE TO RELATED APPLICATIONS

The present application is the U.S. national phase of PCT Application No. PCT/CN2017/107572 filed on Oct. 25, 2017, which claims a priority of the Chinese patent application No. 201710210152.8 filed on Mar. 31, 2017, which are incorporated herein by reference in their entireties.

TECHNICAL FIELD

The present disclosure relates to the field of electronic technology, in particular to a light guide plate, a manufacturing method thereof and a display device.

BACKGROUND

Along with the development of the display technology, a display module has been widely applied to various electronic elements, and an ultra-thin, ultra-light display module has attracted more and more attentions. A glass light guide plate is used as a back plate of the display module, so as to replace a conventional substrate or back plate of the display module, thereby to reduce a thickness of the display module. Usually, the glass light guide plate is attached onto a reflector, so as to form the back plate of the display module, thereby to reduce the thickness of the display module remarkably.

However, the conventional glass light guide plate and the display device need to be improved.

SUMMARY

In one aspect, the present disclosure provides in some embodiments a light guide plate, including a glass substrate, an adhesive layer arranged at a surface of the glass substrate, a reflector arranged at a surface of the adhesive layer away from the glass substrate, and a total reflection structure distributed in the adhesive layer.

In a possible embodiment of the present disclosure, the total reflection structure includes bubbles distributed in the adhesive layer.

In a possible embodiment of the present disclosure, the adhesive layer has a thickness of 200 μm to 500 μm.

In a possible embodiment of the present disclosure, the adhesive layer is made of an adhesive including at least one of a photoresist or an optical clear adhesive.

In a possible embodiment of the present disclosure, the adhesive has a refractive index of 1.4 to 1.6.

In a possible embodiment of the present disclosure, the adhesive layer has a density of 0.9 $g/cm^3$ to 1.1 $g/cm^3$.

In a possible embodiment of the present disclosure, the light guide plate further includes a barrier member arranged between the glass substrate and the reflector and at least partially surrounding the adhesive layer.

In a possible embodiment of the present disclosure, the light guide plate further includes a barrier member arranged between the glass substrate and the reflector and surrounding the adhesive layer.

In a possible embodiment of the present disclosure, a ratio of a light intensity of a light beam at a light-exiting side of the glass substrate to a light intensity of a light beam at a light-entering side of the glass substrate is 0.6 to 0.8.

In another aspect, the present disclosure provides in some embodiments a display device, including the above-mentioned light guide plate. The display device has all the features and advantages of the light guide plate, which will not be particularly defined herein. According to the display device in the embodiments of the present disclosure, it is able to provide at least one of high backlight utilization, high display brightness and an excellent display effect.

In yet another aspect, the present disclosure provides in some embodiments a method for manufacturing the above-mentioned light guide plate, including steps of: providing a glass substrate; forming an adhesive layer including a total reflection structure at a surface of the glass substrate; and arranging a reflector at a surface of the adhesive layer away from the glass substrate.

In a possible embodiment of the present disclosure, the total reflection structure includes bubbles distributed in the adhesive layer. The step of forming the adhesive layer includes: stirring an adhesive so as to form the bubbles therein; coating the adhesive with the bubbles onto the surface of the glass substrate to form a layer of adhesive; and curing the layer of adhesive so as to form the adhesive layer.

In a possible embodiment of the present disclosure, the adhesive is stirred at a speed of 200 rpm to 2000 rpm for more than 30 minutes.

In a possible embodiment of the present disclosure, at least one of gases consisting of compressed air, nitrogen and argon is added into the adhesive during the stirring.

In a possible embodiment of the present disclosure, 1 L to 10 L of the gas is added per unit mass of the adhesive at a flow rate of 0.05 L/min to 0.5 L/min.

In a possible embodiment of the present disclosure, the step of curing the adhesive is performed subsequent to the step of arranging the reflector, and an interval between the step of curing the adhesive and the step of forming the reflector is not greater than 60 s.

In a possible embodiment of the present disclosure, the method further includes forming a barrier member between the glass substrate and the reflector, and the barrier member at least partially surrounds the adhesive layer.

In a possible embodiment of the present disclosure, the method further includes forming a barrier member between the glass substrate and the reflector, and the barrier member surrounds the adhesive layer.

BRIEF DESCRIPTION OF THE DRAWINGS

The above or the other features and the advantages of the present disclosure will become more apparent in conjunction with the drawings. In these drawings.

DETAILED DESCRIPTION OF THE EMBODIMENTS

Figure 1:
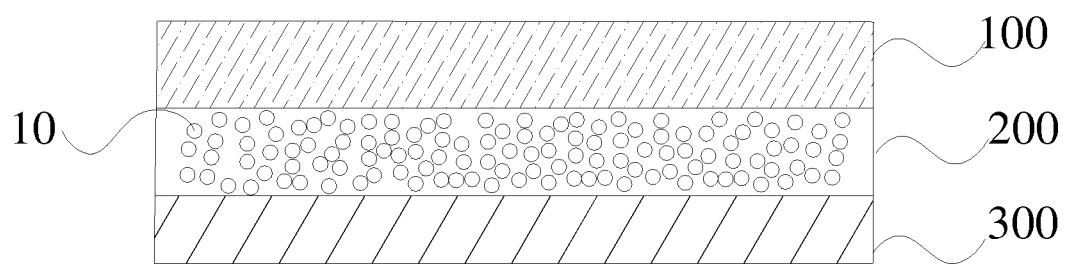
FIG. 1 is a schematic view showing a light guide plate according to one embodiment of the present disclosure.

The present disclosure will be described hereinafter in conjunction with the embodiments and the drawings. Identical or similar reference numbers in the drawings represent an identical or similar element or elements having an identical or similar function. The following embodiments are for illustrative purposes only, but shall not be used to limit the scope of the present disclosure.

In the embodiments of the present disclosure, such words as "on" and "under" are used to indicate directions or positions as viewed in the drawings, and they are merely used to facilitate the description in the present disclosure, rather than to indicate or imply that a device or member must be arranged or operated at a specific position.

For a display module including a glass light guide plate (LGP) as a back plate, there commonly exist such defects as low backlight utilization, low display brightness and insufficient display effect. It is found through researches and experiments that, these defects are mainly caused by the factor that there are many problems for the glass light guide plate as a newly-emerging technology. For example, such a defect as bright band occurs at a light-entering side of the glass light guide plate. During the manufacture, a reflector is attached onto the glass light guide plate through such a material as adhesive. However, a refractive index of the adhesive is far lower than the glass light guide plate, and a total reflection angle of the glass light guide plate becomes too small. At the light-entering side of the glass light guide plate, a large majority of light beams may escape from a surface of the glass light guide plate. At the light-entering side of the glass light guide plate, the brightness is very high, while at a position away from the light-entering side, the brightness is relatively low. Hence, the bright band occurs at the light-entering side, and thereby the backlight utilization is relatively low.

The present disclosure provides in some embodiments a light guide plate which, as shown in FIG. 1, includes a glass substrate 100, an adhesive layer 200 and a reflector 300. The adhesive layer 200 is arranged at a surface of the glass substrate 100 and includes a total reflection structure. In a possible embodiment of the present disclosure, the total reflection structure includes bubbles 10 distributed in the adhesive layer. The reflector 300 is arranged at a surface of the adhesive layer 200 away from the glass substrate 100. Through the total reflection structure, e.g., the bubbles 10 distributed in the adhesive layer 200, it is able to form a total reflection interface in the adhesive layer 200, thereby to increase a ratio of the light totally reflected by the light guide plate, prevent the occurrence of a bright band at a light-entering side of the light guide plate, and improve the backlight utilization.

It is found through experiments that a light guide effect of the light guide plate may depend on a density of the bubbles 10, a size of each bubble 10 and a total amount of the bubbles 10 in the adhesive layer 200. When the density of the bubbles 10 is relatively large and the size of each bubble 10 is relatively small, it is able to increase the ratio of the light totally reflected by the light guide plate, and when bubbles included in the adhesive layer have small size and densely distributed, the viscosity and the service life of the adhesive layer 200 are not adversely affected.

In a possible embodiment of the present disclosure, the total amount of the bubbles 10 in the adhesive layer 200 may be controlled in such a manner that a density of the adhesive layer 200 is 0.9 g/cm$^3$ to 1.1 g/cm$^3$. It is found through experiments that, when the density of the adhesive layer 200 is within the above-mentioned range, it is able to provide the adhesive layer 200 with an appropriate amount of bubbles, thereby to ensure the performance of the adhesive layer 200 while improving the backlight utilization of the light guide plate.

In a possible embodiment of the present disclosure, the adhesive layer 200 may have a thickness of 200 μm to 500 μm, so as to prolong an optical path of a light beam in the adhesive layer 200, thereby to further increase the ratio of the light totally reflected by the bubbles. In addition, it is able to provide the bubbles 10 as many as possible in the adhesive layer 200 having a relatively large thickness. It should be appreciated that, the thickness of the adhesive layer refers to a height of the adhesive layer 200 in a direction perpendicular to the glass substrate, e.g., H as shown in FIG. 2.

In the embodiments of the present disclosure, a component of the adhesive layer 200 will not be particularly defined herein, as long as the reflector 300 may be attached onto the glass substrate 100. In a possible embodiment of the present disclosure, the adhesive layer 200 may be made of an adhesive. It should be appreciated that, the term "adhesive" may have a general meaning, and any liquid having viscosity and capable of attaching the reflector 300 onto the glass substrate 100 may be considered as the adhesive. A type of the adhesive will not be particularly defined herein. For example, the adhesive may include at least one of a photoresist and an optical clear adhesive. The adhesive may be acquired easily, so it is able to reduce the manufacture cost, and facilitate the mass production of the light guide plate. In a possible embodiment of the present disclosure, the adhesive may have a refractive index of 1.4 to 1.6, e.g., 1.5. In this way, the refractive index of the adhesive is close to a refractive index of the glass substrate, so as to further improve the light guide effect of the light guide plate.

Figure 2:
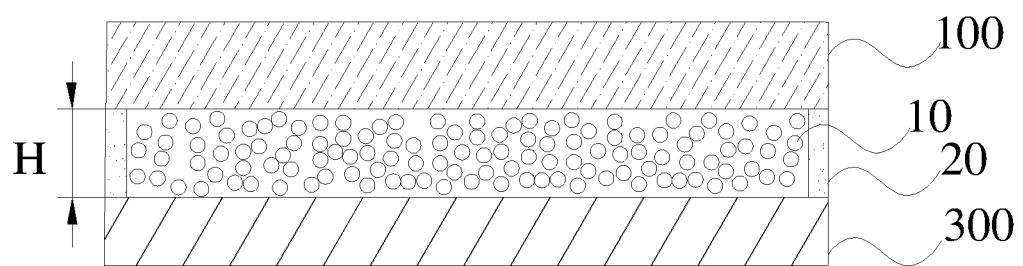
FIG. 2 is another schematic view showing the light guide plate according to one embodiment of the present disclosure.
Figure 3:
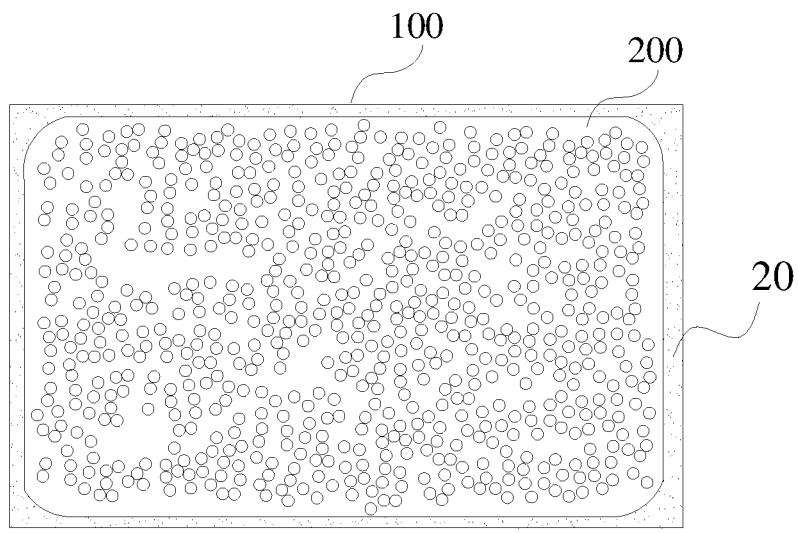
FIG. 3 is a topical schematic view showing the light guide plate according to one embodiment of the present disclosure.

Referring to FIG. 2, the light guide plate may further include a barrier member 20 arranged between the glass substrate 100 and the reflector 300 and at least partially surrounding the adhesive layer 200. The barrier member 20 may be made of a material capable of preventing water and air from passing therethrough, so as to prevent the adhesive layer 200 from being damaged by an external environment, and prevent the bubbles in the adhesive layer 200 from escaping. The material of the barrier member 20 will not be particularly defined herein, as long as it is able to achieve the above-mentioned function. For example, the barrier member 20 may be made of a food-grade barrier membrane. In a possible embodiment of the present disclosure, as shown in FIG. 3, the barrier member 20 may surround the adhesive layer 200, so as to prevent the bubbles from escaping, thereby to prevent the decreasing of the reflectivity.

Figure 4:
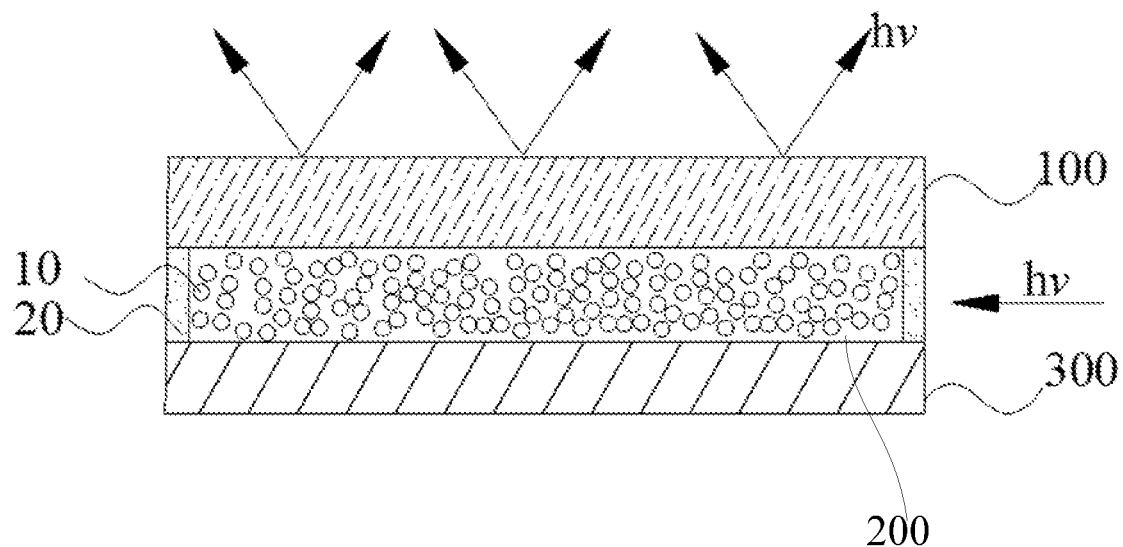
FIG. 4 is yet another schematic view showing the light guide plate according to one embodiment of the present disclosure.

In a possible embodiment of the present disclosure, a ratio of a light intensity of a light beam at a light-exiting side of the glass substrate to a light intensity of a light beam at a light-entering side of the glass substrate is 0.6 to 0.8, so as to further prevent the occurrence of the bright band at the light-entering side of the light guide plate, and improve the backlight utilization. As shown in FIG. 4, taking an edge-type backlight source as an example, a light beam from the backlight source enters the light guide plate from its side surface (i.e., a side surface of the glass substrate 100), transmitted in the adhesive layer 200, totally reflected by an interface between the adhesive and the bubble 10, and then exit at a light-exiting side of the glass substrate 100. In a word, through the adhesive layer 200 with the bubbles 10, it is able to increase a ratio of the light beams totally reflected by the light guide plate and prevent the light beams from escaping at the light-entering side, thereby to prevent the occurrence of the bright band at the light-entering side, and improve the backlight utilization.

It should be appreciated that, when the edge-type backlight source is adopted and the light guide plate includes the barrier member 20 surrounding the adhesive layer 200, the barrier member 20 needs to be made of a transparent material, i.e., it is necessary for the barrier member 20 not to shield the light beams while preventing the water and air from passing therethrough.

The present disclosure further provides in some embodiments a display device including the above-mentioned light guide plate. The display device has all the features and advantages of the light guide plate, which will not be particularly defined herein. In a word, it is able for the display device to provide at least one of high backlight utilization, high display brightness and an excellent display effect.

Figure 5:
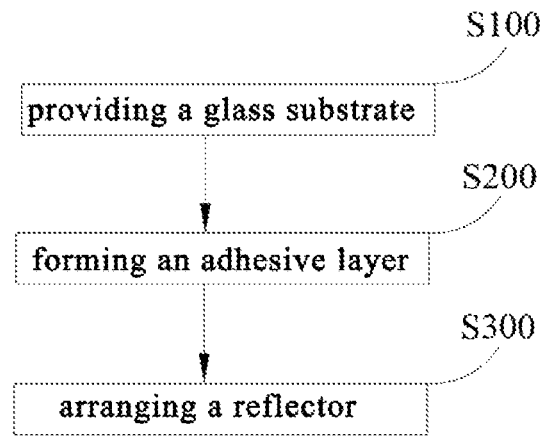
FIG. 5 is a flow chart of a method for manufacturing the light guide plate according to one embodiment of the present disclosure.

The present disclosure further provides in some embodiments a method for manufacturing the above-mentioned light guide plate which, as shown in FIG. 5, includes the following steps.

Step S100: providing a glass substrate. It should be appreciated that, a type and a shape of the glass substrate will not be particularly defined herein, and the glass substrate may be selected in accordance with the practical need, e.g., the requirement on the performance of the light guide plate.

Step S200: forming an adhesive layer. In this step, the adhesive layer is arranged at a surface of the glass substrate, and bubbles are formed in the adhesive layer. Through the bubbles in the adhesive layer, it is able to increase the ratio of the light totally reflected by the light guide plate, thereby to prevent the occurrence of the bright band at the light-entering side of the light guide plate.

Figure 6:
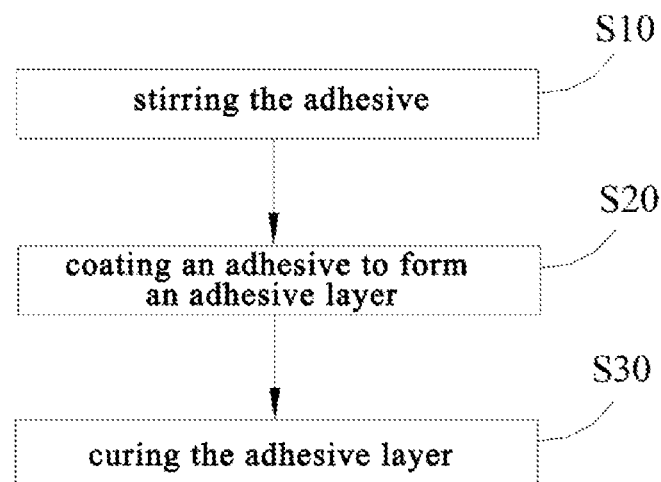
FIG. 6 is a part of a flow chart of a method for manufacturing the light guide plate according to one embodiment of the present disclosure.

As shown in FIG. 6, the adhesive layer may be formed through the following steps.

Step S10: stirring an adhesive. In this step, the adhesive may be stirred so as to form the bubbles therein. It is found through experiments that, when the adhesive layer is made of an adhesive such as optical clear adhesive (OCA) or optical clear resin (OCR), due to the viscosity of the adhesive, it is able to form a large number of bubbles in the adhesive by rapidly stirring the adhesive. In addition, through stirring, it is able to reduce the production cost.

In the embodiments of the present disclosure, such parameters as a stirring speed and a stirring duration will not be particularly defined herein, and they may be selected in accordance with the viscosity of the adhesive and the requirement on the performance of the resultant light guide plate. For example, when the adhesive layer is made of OCA, the adhesive may be stirred for more than 30 minutes, so as to control a size of each bubble and a total amount of the bubbles in the adhesive. In a possible embodiment of the present disclosure, a gas may be added into the adhesive during the stirring, so as to form the bubbles in the adhesive rapidly. For example, at least one of the gases consisting of compressed air, nitrogen and argon may be added into the adhesive. These gases may not react with the adhesive, so it is able to prevent the service life of the light guide plate from being adversely affected.

In the embodiments of the present disclosure, an amount of the gas added into the adhesive will not be particularly defined herein, and it may be selected in accordance with the practical need, as long as the resultant light guide plate may have a relatively large total reflection rate and the occurrence of the bright band at the light-entering side may be prevent. In a possible embodiment of the present disclosure, 1 L to 10 L of the gas may be added per unit mass of the adhesive. In another possible embodiment of the present disclosure, the gas may be added into the adhesive at a flow rate of 0.05 L/min to 0.5 L/min, so as to reduce a size of each bubble and increase the number of the bubbles in the adhesive.

Step S20: coating the adhesive to form a layer of adhesive. In this step, the adhesive with the bubbles is coated onto the surface of the glass substrate so as to form the layer of adhesive. An operating parameter of the coating step and a coating method will not be particularly defined herein, and they may be selected in accordance with the practical need, e.g., the viscosity of the adhesive with the bubbles and the thickness of the resultant adhesive layer, as long as it is able to form the adhesive layer with an appropriate and uniform thickness and the bubbles in the adhesive layer may not be broken or may not escape from the adhesive layer.

Step S30: curing the layer of adhesive. In this step, the layer of adhesive may be cured, so as to form the adhesive layer.

Step S300: forming a reflector. In this step, the reflector may be arranged at a surface of the adhesive layer away from the glass substrate, so as to acquire the above-mentioned light guide plate.

It should be appreciated that, the reflector may be arranged prior to the step of curing the adhesive, so as to facilitate the attachment of the reflector. In the embodiments of the present disclosure, the step of curing the adhesive needs to be performed immediately after the arrangement of the reflector, so as to prevent the bubbles from escaping from the adhesive, thereby to ensure the performance of the resultant light guide plate. In a possible embodiment of the present disclosure, an interval between the step of curing the adhesive and the step of arranging the reflector is not greater than 60 s, so as to rapidly cure the adhesive and prevent the bubbles from escaping from the adhesive before the adhesive has been cured completely.

Figure 7:
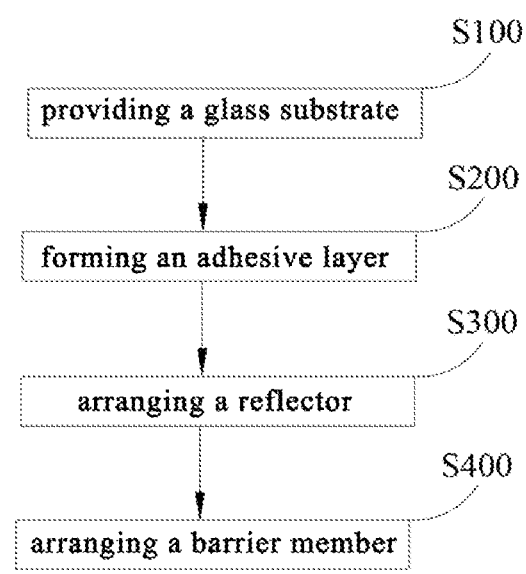
FIG. 7 is another flow chart of the method for manufacturing the light guide plate according to one embodiment of the present disclosure.

As shown in FIG. 7, in order to further improve the service life of the light guide plate, the method may further include Step S400 of forming a barrier member. In this step, the barrier member may be arranged between the glass substrate and the reflector. The component and the position of the barrier member have been described hereinabove, and thus will not be particularly defined herein. In a possible embodiment of the present disclosure, the barrier member may at least partially surround the adhesive layer, so as to prevent the bubbles from escaping, thereby to prolong the service life of the light guide plate.

In a word, the method in the embodiments of the present disclosure has at least one of the following advantages. (1) It is able to implement the method easily at low production cost, i.e., to produce the light guide plate without using any expensive device. (2) It is able to shorten a production period, thereby to facilitate the mass production of the light guide plate. (3) It is able to improve the backlight utilization and the service life of the light guide plate. (4) It is able to manufacture the light guide plates with different parameters.

In the above description, the phrases "one possible embodiment" and "another possible embodiment" intend to indicate that the features, structures or materials in this embodiment may be included in at least one embodiment of the present disclosure. The above-mentioned features, structures or materials may be combined in an appropriate manner in one or more embodiments. In addition, the embodiments or the features therein may be combined in any way if no conflict.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A light guide plate, comprising:
a glass substrate;
an adhesive layer arranged at a surface of the glass substrate;
a reflector arranged at a surface of the adhesive layer away from the glass substrate; and
a total reflection structure distributed in the adhesive layer,
wherein the total reflection structure comprises bubbles distributed in the adhesive layer.

2. The light guide plate according to claim 1, wherein the adhesive layer has a thickness of 200 μm to 500 μm.

3. The light guide plate according to claim 2, wherein the adhesive layer is made of an adhesive comprising at least one of a photoresist or an optical clear adhesive.

4. The light guide plate according to claim 2, wherein the adhesive has a refractive index of 1.4 to 1.6.

5. The light guide plate according to claim 3, wherein the adhesive layer has a density of 0.9 g/cm$^3$ to 1.1 g/cm$^3$.

6. A light guide plate, comprising:
a glass substrate;
an adhesive layer arranged at a surface of the glass substrate;
a reflector arranged at a surface of the adhesive layer away from the glass substrate;
a total reflection structure distributed in the adhesive layer; and
a barrier member arranged between the glass substrate and the reflector and at least partially surrounding the adhesive layer.

7. A light guide plate, comprising:
a glass substrate;
an adhesive layer arranged at a surface of the glass substrate;
a reflector arranged at a surface of the adhesive layer away from the glass substrate;
a total reflection structure distributed in the adhesive layer; and
a barrier member arranged between the glass substrate and the reflector and surrounding the adhesive layer.

8. The light guide plate according to claim 1, wherein a ratio of a light intensity of a light beam at a light-exiting side of the glass substrate to a light intensity of a light beam at a light-entering side of the glass substrate is 0.6 to 0.8.

9. A display device comprising the light guide plate according to claim 1.

10. A method for manufacturing the light guide plate according to claim 1, comprising steps of:
providing a glass substrate;
forming an adhesive layer including a total reflection structure at a surface of the glass substrate; and
arranging a reflector at a surface of the adhesive layer away from the glass substrate.

11. The method according to claim 10, wherein the total reflection structure comprises bubbles distributed in the adhesive layer, wherein the step of forming the adhesive layer comprises:
stirring an adhesive so as to form the bubbles therein;
coating the adhesive with the bubbles onto the surface of the glass substrate to form a layer of adhesive; and
curing the layer of adhesive so as to form the adhesive layer.

12. The method according to claim 11, wherein the adhesive is stirred at a speed of 200 rpm to 2000 rpm for more than 30 minutes.

13. The method according to claim 11, wherein at least one of gases consisting of compressed air, nitrogen and argon is added into the adhesive during the stirring.

14. The method according to claim 13, wherein 1 L to 10 L of the gas is added per unit mass of the adhesive at a flow rate of 0.05 L/min to 0.5 L/min.

15. The method according to claim 10, wherein the step of curing the adhesive is performed subsequent to the step of arranging the reflector, and an interval between the step of curing the adhesive and the step of forming the reflector is not greater than 60 s.

16. The method according to claim 10, further comprising forming a barrier member between the glass substrate and the reflector, wherein the barrier member at least partially surrounds the adhesive layer.

17. The method according to claim 10, further comprising forming a barrier member between the glass substrate and the reflector, wherein the barrier member surrounds the adhesive layer.

* * * * *